(12) United States Patent
Maheshwari et al.

(10) Patent No.: US 10,136,446 B2
(45) Date of Patent: Nov. 20, 2018

(54) TECHNIQUES AND APPARATUSES FOR VOICE OVER LONG TERM EVOLUTION (VOLTE) CALL PRIORITIZATION FOR MULTIPLE CARRIERS

(71) Applicant: QUALCOMM Incorporated, San Diego, CA (US)

(72) Inventors: Ankit Maheshwari, Hyderabad (IN); Rimal Patel, Hyderabad (IN); Atul Soni, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/459,530

(22) Filed: Mar. 15, 2017

(65) Prior Publication Data

US 2018/0270838 A1  Sep. 20, 2018

(51) Int. Cl.
*H04W 72/04* (2009.01)
*H04W 72/10* (2009.01)
(Continued)

(52) U.S. Cl.
CPC .......... *H04W 72/10* (2013.01); *H04B 1/3816* (2013.01); *H04W 72/0453* (2013.01); *H04W 88/06* (2013.01)

(58) Field of Classification Search
CPC . H04W 72/10; H04W 72/0453; H04W 88/06; H04W 52/346; H04W 52/365; H04W 72/0406; H04W 72/042; H04W 28/12; H04W 36/22; H04W 52/146; H04W 52/367; H04W 52/42; H04W 72/0446; H04W 72/0486; H04W 76/025; H04W 76/046; H04W 76/15; H04W 24/02; H04W 28/0278; H04W 52/0216; H04W 52/04; H04W 52/18; H04W 52/228; H04W 52/245; H04W 52/265; H04W 52/283; H04W 52/286; H04W 36/30; H04W 48/20; H04W 4/06; H04W 52/00; H04W 52/02; H04W 56/001; H04W 68/02; H04W 72/02; H04W 72/04; H04W 72/0413; H04W 72/1215; H04W 72/1278; H04W 74/02;
(Continued)

(56) References Cited

U.S. PATENT DOCUMENTS 7,003,044 B2   2/2006 Subramanian et al.
9,143,303 B1 * 9/2015 Marupaduga ......... H04L 5/0092
(Continued)

FOREIGN PATENT DOCUMENTS

WO   WO 2016078600 A1 * 5/2016   .......... H04W 56/001

*Primary Examiner* — Nathan Taylor
(74) *Attorney, Agent, or Firm* — Harrity & Harrity, LLP/Qualcomm

(57) ABSTRACT

Certain aspects of the present disclosure generally relate to wireless communication. In some aspects, a user equipment may receive a plurality of resource block allocations corresponding to a plurality of carriers. The user equipment may identify a carrier, of the plurality of carriers, to be used for communication of at least one high priority communication based at least in part on a comparison of a plurality of frequencies corresponding to the plurality of resource block allocations. The user equipment may communicate the at least one high priority communication using the identified carrier. Numerous other aspects are provided.

30 Claims, 13 Drawing Sheets

(51) Int. Cl.
*H04B 1/3816* (2015.01)
*H04W 88/06* (2009.01)

(58) Field of Classification Search
CPC . H04W 74/0833; H04W 76/27; H04W 88/02; H04B 1/3816
USPC ......... 455/450, 458; 307/329, 254, 311, 228
See application file for complete search history.

(56) References Cited

U.S. PATENT DOCUMENTS

| | | |
|---|---|---|
| 9,191,925 B2 | 11/2015 | Roessel et al. |
| 9,473,286 B1 * | 10/2016 | Shipley ................. H04L 5/0062 |
| 2011/0141959 A1 * | 6/2011 | Damnjanovic ....... H04L 1/1854 370/311 |
| 2012/0147801 A1 * | 6/2012 | Ho ...................... H04W 52/365 370/311 |
| 2015/0003385 A1 * | 1/2015 | Kim .................... H04W 52/146 370/329 |
| 2015/0139080 A1 * | 5/2015 | Ellenbeck ................ H04L 1/00 370/329 |
| 2015/0181638 A1 * | 6/2015 | Tabet .................. H04W 76/025 370/228 |
| 2015/0230206 A1 * | 8/2015 | Tabet .................... H04W 72/02 370/329 |
| 2015/0296520 A1 | 10/2015 | Batchu et al. |
| 2016/0142998 A1 * | 5/2016 | Tsai .................... H04B 1/3816 455/458 |
| 2016/0345327 A1 | 11/2016 | Clegg |

* cited by examiner

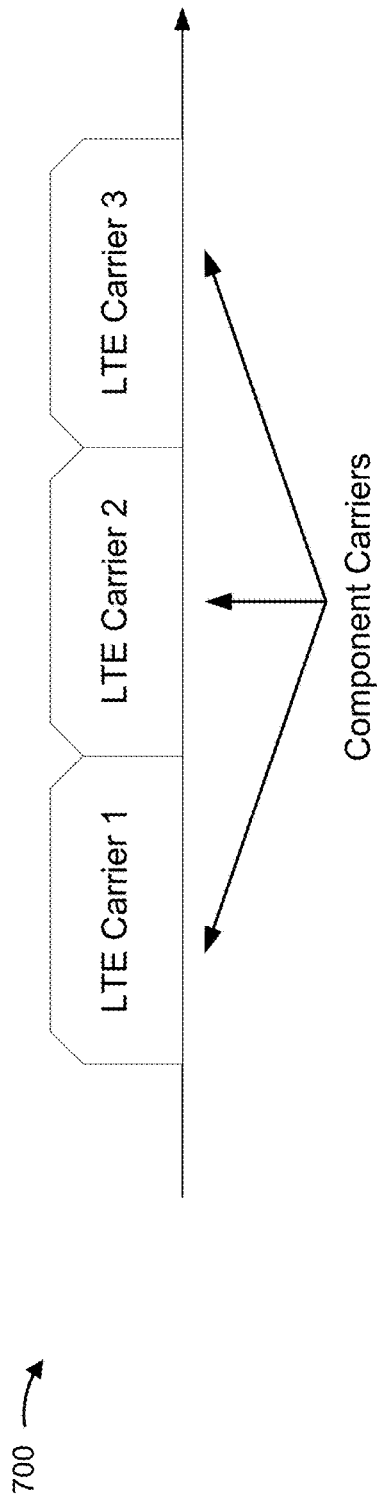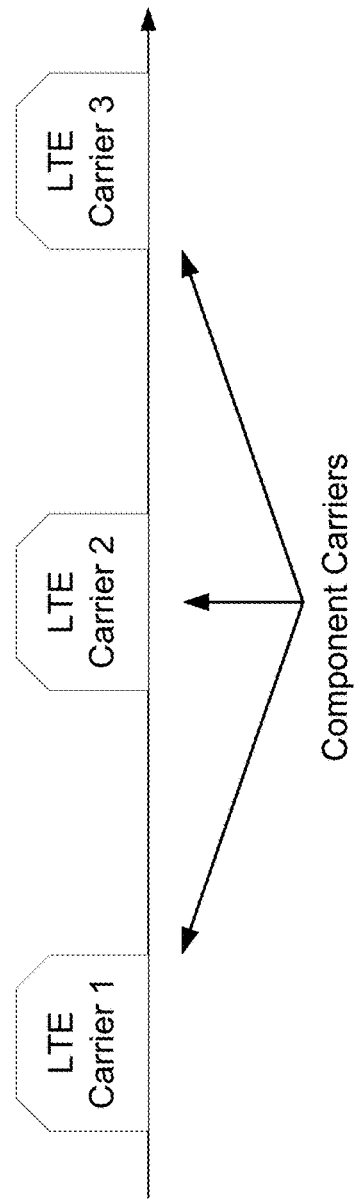

TECHNIQUES AND APPARATUSES FOR VOICE OVER LONG TERM EVOLUTION (VOLTE) CALL PRIORITIZATION FOR MULTIPLE CARRIERS

FIELD OF THE DISCLOSURE

Aspects of the present disclosure generally relate to wireless communication, and more particularly to techniques and apparatuses for Voice over Long Term Evolution (VoLTE) call prioritization for multiple carriers.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include receiving, by a user equipment, a plurality of resource block allocations corresponding to a plurality of carriers; identifying, by the user equipment, a carrier, of the plurality of carriers, to be used for communication of at least one high priority communication based at least in part on a comparison of a plurality of frequencies corresponding to the plurality of resource block allocations; and communicating, by the user equipment, the at least one high priority communication using the identified carrier.

In some aspects, a method of wireless communication may include identifying, by a user equipment, that a condition for reducing transmit power is satisfied, wherein the user equipment uses a plurality of carriers for transmission of communications; and reducing, by the user equipment, a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication.

In some aspects, a user equipment may include a memory and one or more processors operatively coupled to the memory. The one or more processors may be configured to receive a plurality of resource block allocations corresponding to a plurality of carriers; identify a carrier, of the plurality of carriers, to be used for communication of at least one high priority communication based at least in part on a comparison of a plurality of frequencies corresponding to the plurality of resource block allocations; and communicate the at least one high priority communication using the identified carrier.

In some aspects, a user equipment may include a memory and one or more processors operatively coupled to the memory. The one or more processors may be configured to identify that a condition for reducing transmit power is satisfied, wherein the user equipment uses a plurality of carriers for transmission of communications; and reduce a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication.

In some aspects, a non-transitory computer-readable medium may store one or more instructions for wireless communication. The one or more instructions, when executed by one or more processors of a user equipment, may cause the one or more processors to receive a plurality of resource block allocations corresponding to a plurality of carriers; identify a carrier, of the plurality of carriers, to be used for communication of at least one high priority communication based at least in part on a comparison of a plurality of frequencies corresponding to the plurality of resource block allocations; and communicate the at least one high priority communication using the identified carrier.

In some aspects, a non-transitory computer-readable medium may store one or more instructions for wireless communication. The one or more instructions, when executed by one or more processors of a user equipment, may cause the one or more processors to identify that a condition for reducing transmit power is satisfied, wherein the user equipment uses a plurality of carriers for transmission of communications; and reduce a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication.

In some aspects, an apparatus for wireless communication may include means for receiving a plurality of resource block allocations corresponding to a plurality of carriers; means for identifying a carrier, of the plurality of carriers, to be used for communication of at least one high priority communication based at least in part on a comparison of a plurality of frequencies corresponding to the plurality of resource block allocations; and means for communicating the at least one high priority communication using the identified carrier.

In some aspects, an apparatus for wireless communication may include means for identifying that a condition for reducing transmit power is satisfied, wherein the apparatus uses a plurality of carriers for transmission of communications; and means for reducing a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating example carrier aggregation types, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
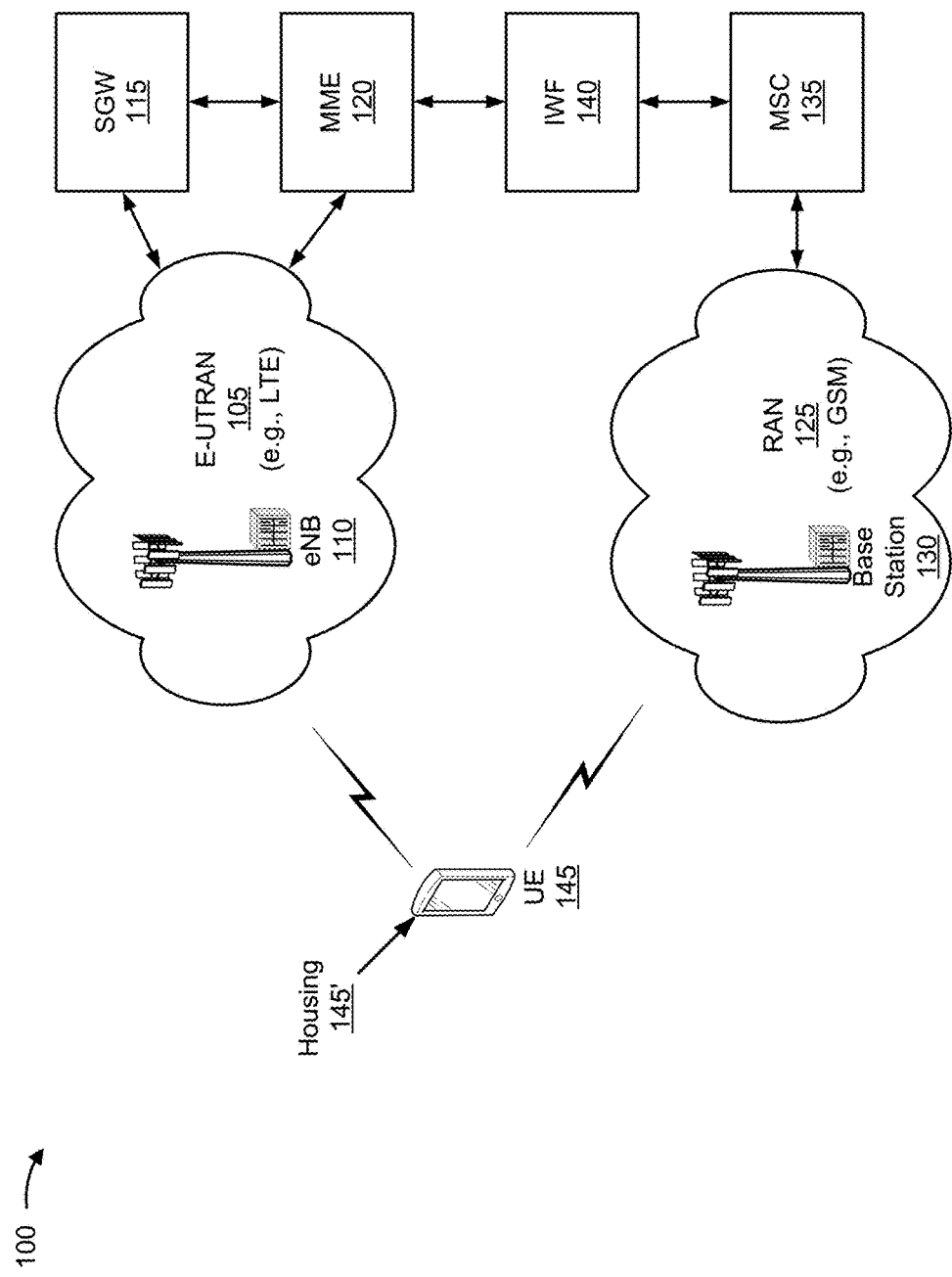
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like. In some aspects, UE 145 may be a dual subscriber identify module (SIM) dual active (DSDA) UE, a dual radio DSDA (DR-DSDA) UE, and/or the like. In this case, the UE 145 may have subscriptions with multiple network operators, or may have multiple subscriptions with a single network operator.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
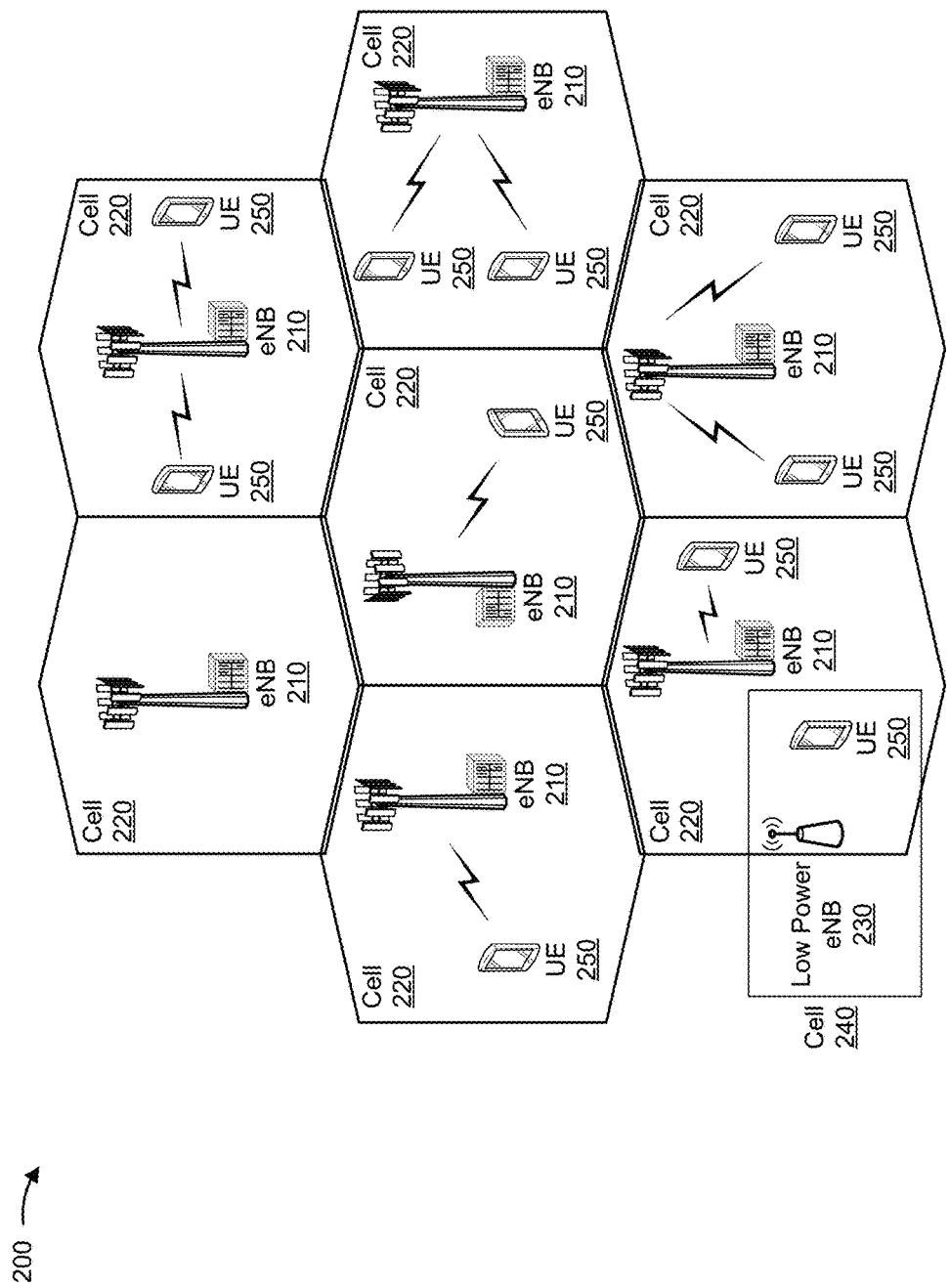
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
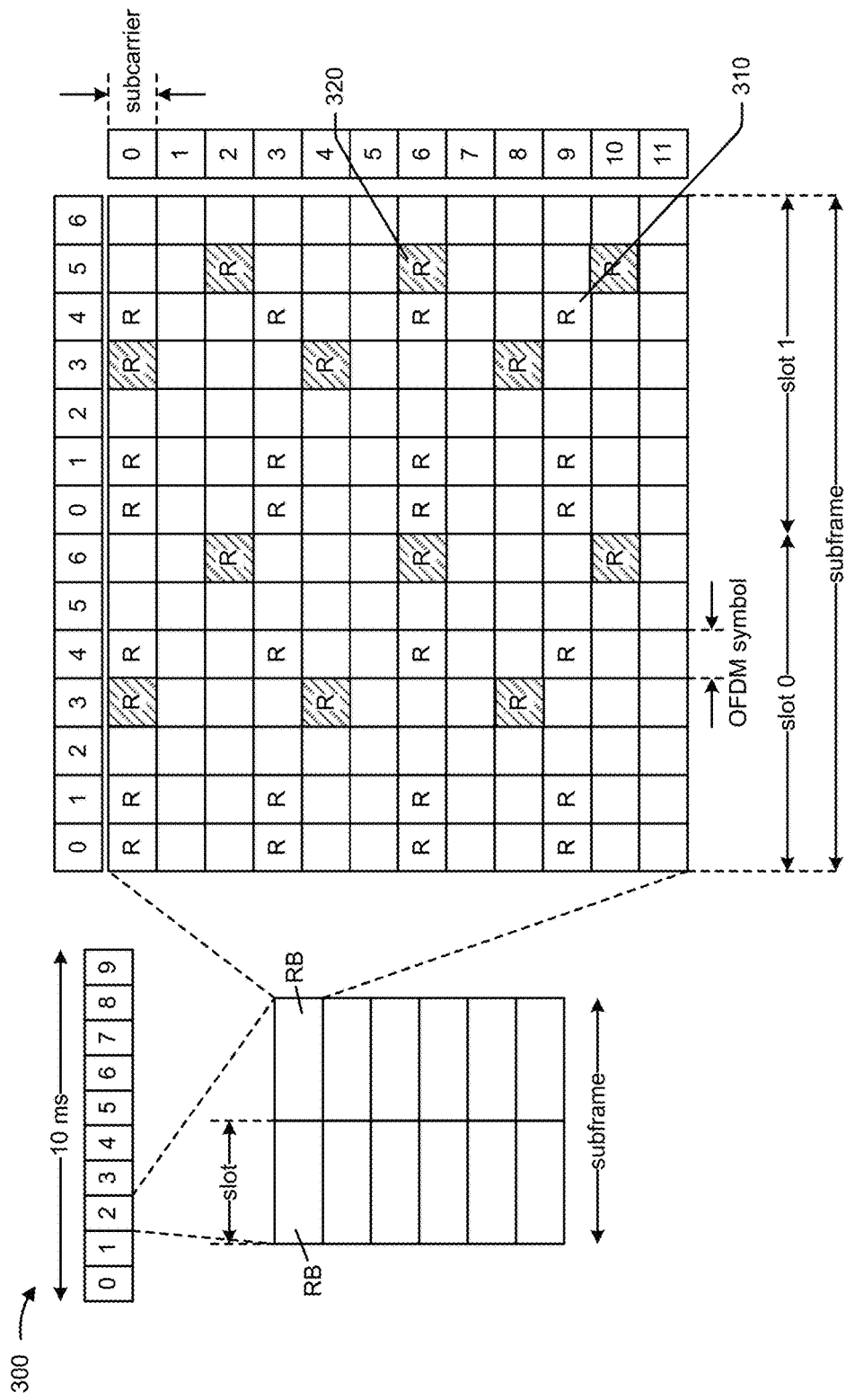
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
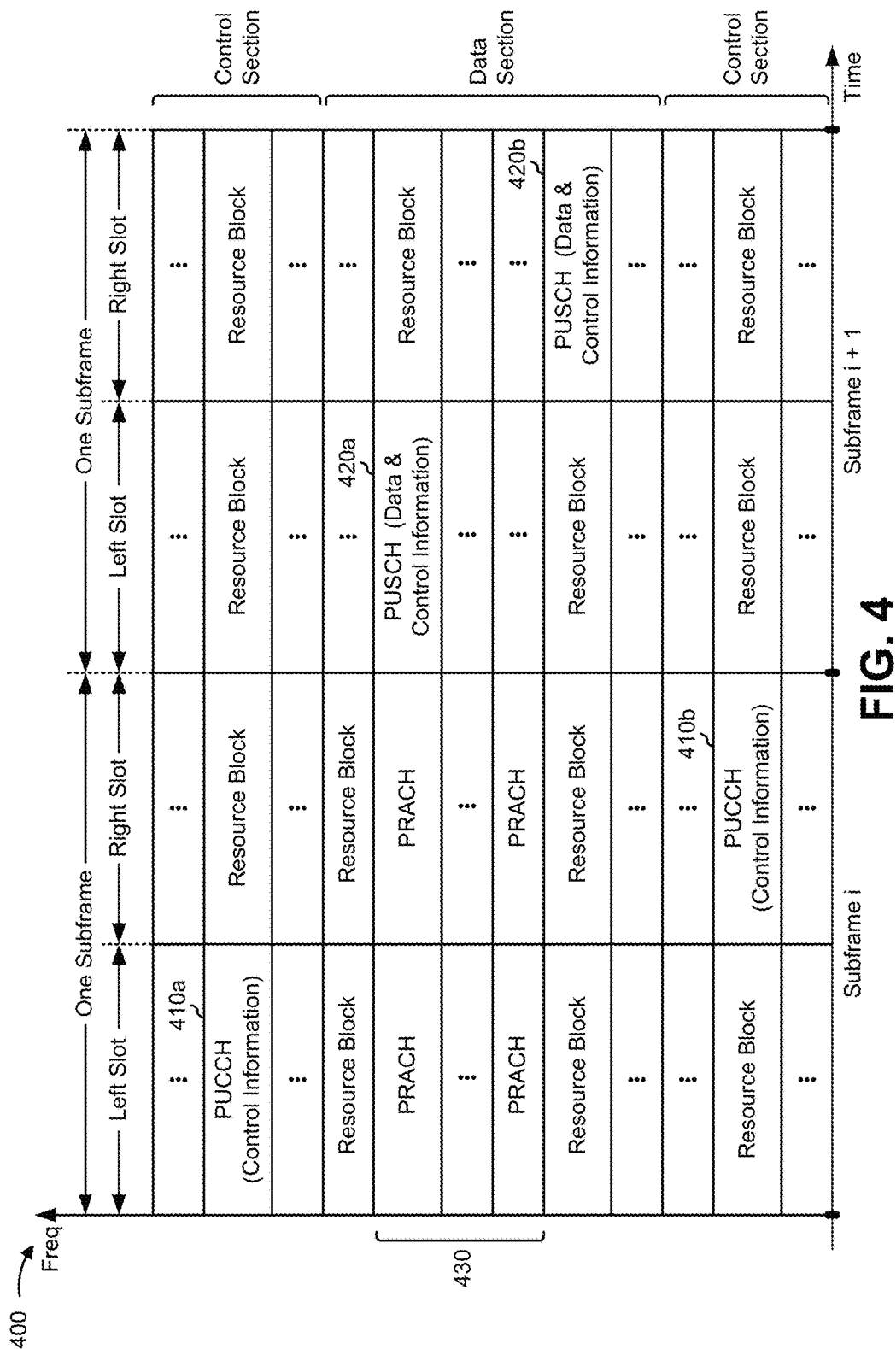
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
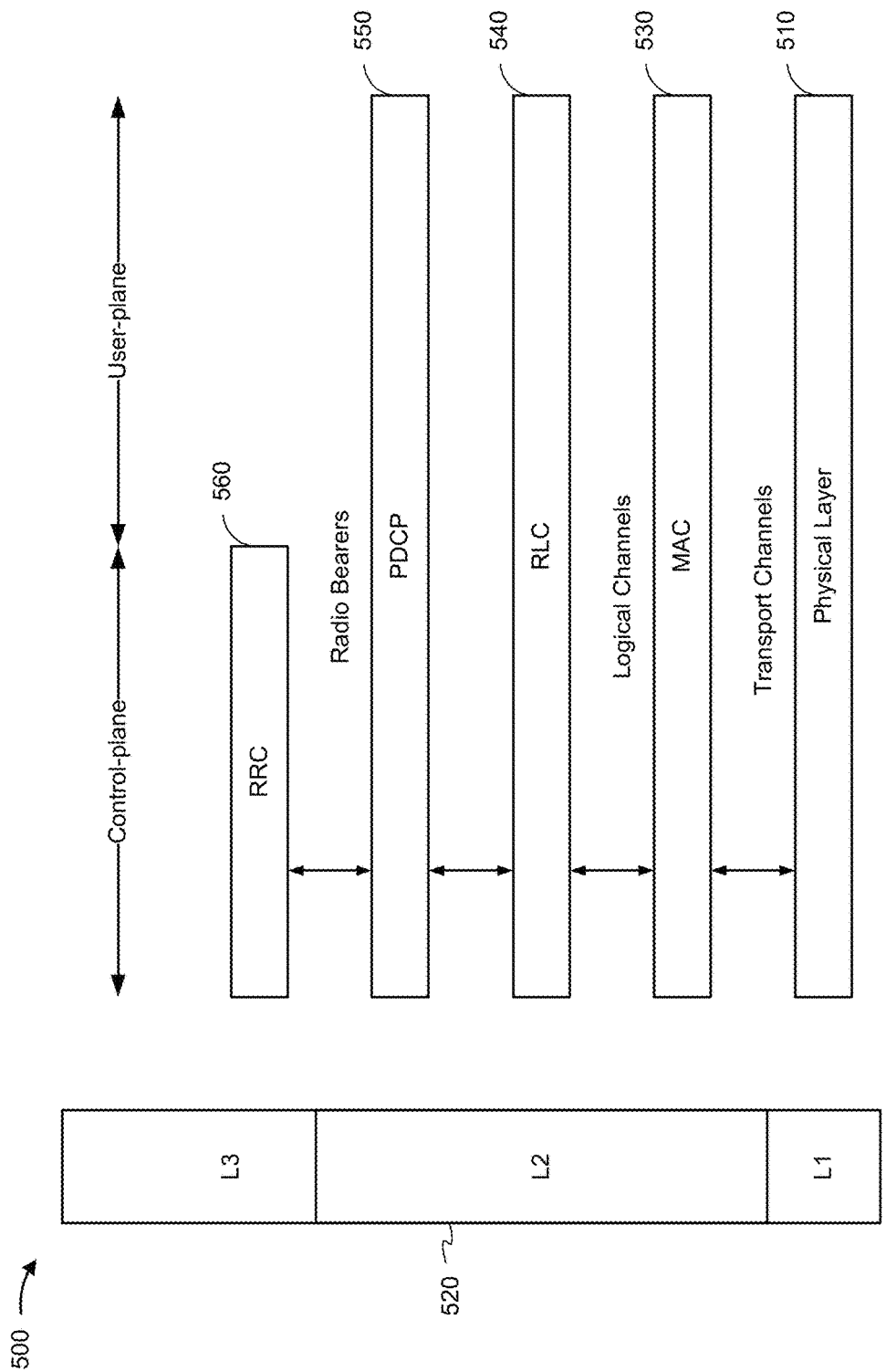
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
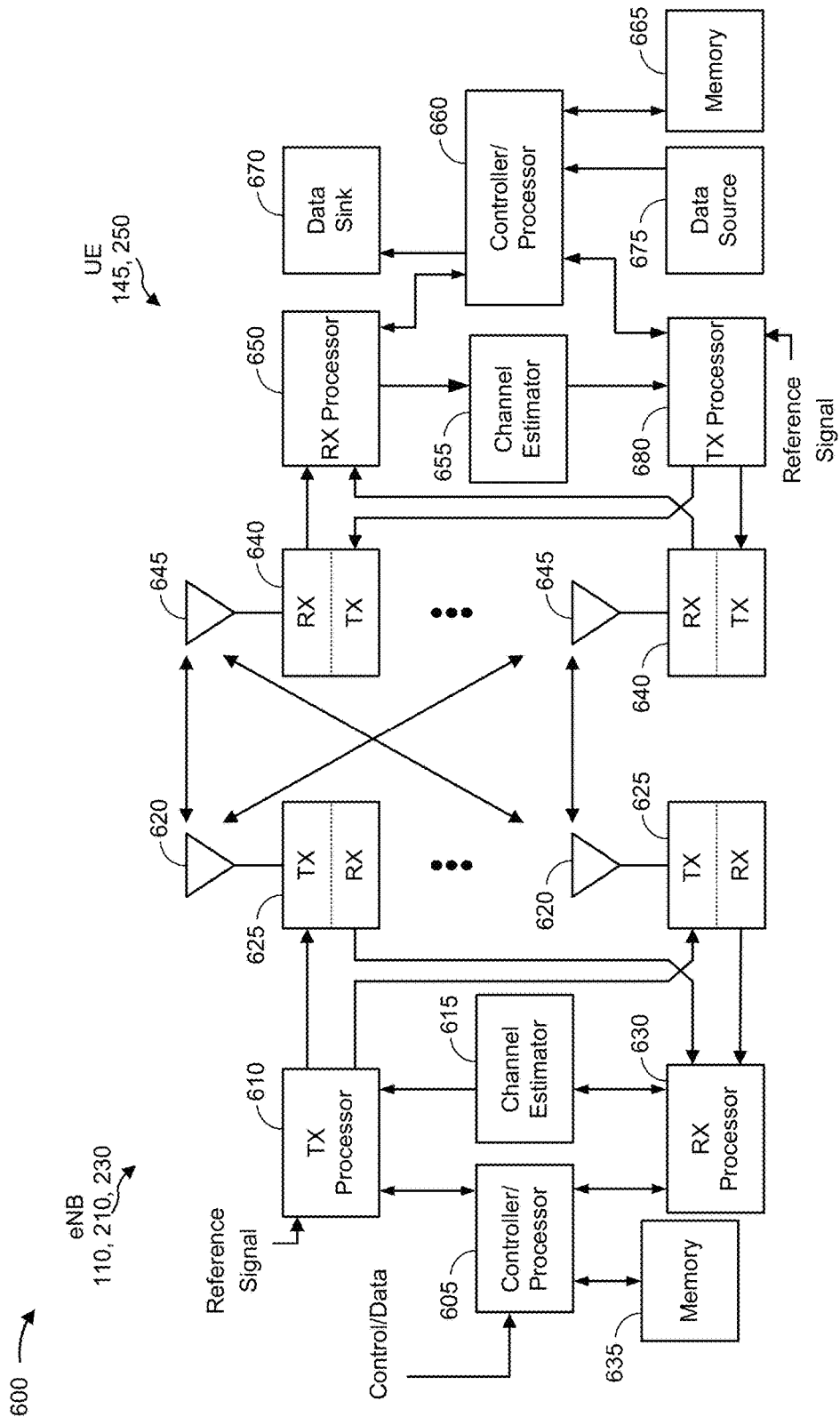
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to perform VoLTE call prioritization for multiple carriers, as described in more detail elsewhere herein. For example, the controller/processor 660 and/or other processors and modules of UE 145, 250 may perform or direct operations of, for example, process 1200 of FIG. 12, process 1300 of FIG. 13, and/or other processes as described herein. In some aspects, one or more of the components shown in FIG. 6 may be employed to perform example process 1200, example process 1300, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

FIGS. 7A and 7B are illustrations of examples 700 of carrier aggregation types, in accordance with various aspects of the present disclosure.

In some aspects, a UE 145, 250 may use spectrum of up to 20 MHz bandwidths allocated in a carrier aggregation of up to a total of 100 MHz (e.g., 5 component carriers) used for transmission and reception. For an LTE-Advanced enabled wireless communication system, two types of carrier aggregation (CA) methods may be used, contiguous CA and non-contiguous CA, which are illustrated in FIGS. 7A and 7B, respectively. Contiguous CA occurs when multiple available component carriers are adjacent to each other (e.g., as illustrated in FIG. 7A), which may occur in a contiguous carrier aggregation frequency band. On the other hand, non-contiguous CA occurs when multiple non-adjacent available component carriers are separated along the frequency band (e.g., as illustrated in FIG. 7B) and/or are included in different frequency bands (e.g., associated with and/or licensed by different network operators, which may occur in multiple inter-operator frequency bands).

Both non-contiguous and contiguous CA may aggregate multiple component carriers to serve a single unit of LTE-Advanced UEs 145, 250. In various examples, a UE 145, 250 operating in a multicarrier system (e.g., also referred to as carrier aggregation) is configured to aggregate certain functions of multiple carriers, such as control and feedback functions, on the same carrier, which may be referred to as a primary carrier. The remaining carriers that depend on the primary carrier for support may be referred to as secondary carriers. For example, the UE 145, 250 may aggregate control functions such as those provided by the optional dedicated channel (DCH), the nonscheduled grants, a physical uplink control channel (PUCCH), and/or a physical downlink control channel (PDCCH).

As indicated above, FIGS. 7A and 7B are provided as examples. Other examples are possible and may differ from what was described in connection with FIGS. 7A and 7B.

Figure 8:
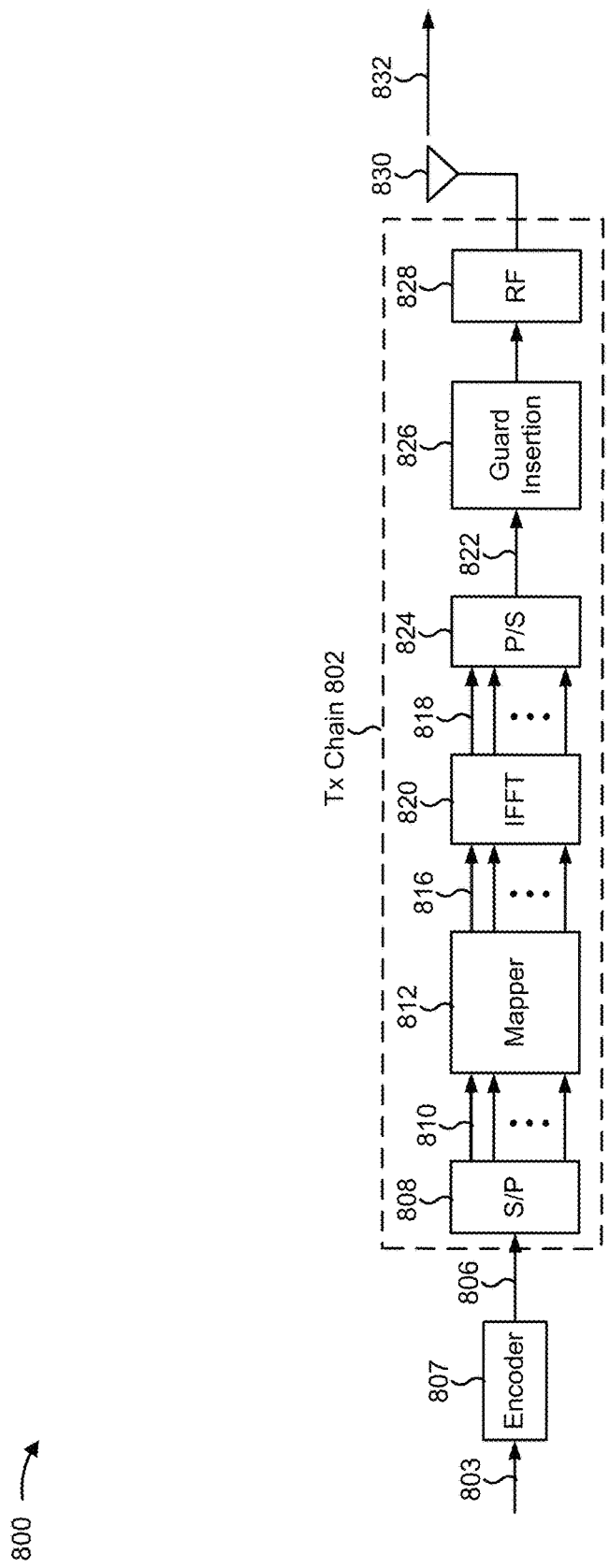
FIG. 8 is a diagram illustrating an example transmission chain in a user equipment.

FIG. 8 is a diagram illustrating an example 800 of a transmission (Tx) chain 802 of a UE 145, 250. In some aspects, some or all of Tx chain 802 may be implemented in the Tx processor 680 and/or TX/RX 625 of the UE 145, 250 as shown in FIG. 6.

An encoder 807 may alter a signal (e.g., a bitstream) 803 into data 806. Data 806 to be transmitted is provided from encoder 807 as input to a serial-to-parallel (S/P) converter 808. In some aspects, S/P converter 808 may split the transmission data into N parallel data streams 810.

The N parallel data streams 810 may then be provided as input to a mapper 812. Mapper 812 may map the N parallel data streams 810 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), and/or the like. Thus, mapper 812 may output N parallel symbol streams 816, each symbol stream 816 corresponding to one of N orthogonal subcarriers of an inverse fast Fourier transform (IFFT) component 820. These N parallel symbol streams 816 are represented in the frequency domain and may be converted into N parallel time domain sample streams 818 by IFFT component 820.

In some aspects, N parallel modulations in the frequency domain are equal to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 818 may be converted into an OFDM/OFDMA symbol stream 822 by a parallel-to-serial (P/S) converter 824. A guard insertion component 826 may insert a guard interval between successive OFDM/OFDMA symbols in the OFDM/OFDMA symbol stream 822. The output of guard insertion component 826 may then be upconverted to a desired transmit frequency band by a radio frequency (RF) front end 828. An antenna 830 may then transmit the resulting signal 832.

In some aspects, the UE 145, 250 may use a single Tx chain (e.g., a single RF communication chain) for communication using multiple carriers, such as when the UE 145, 250 uses intra-band contiguous carrier aggregation for the multiple carriers. In some aspects, the UE 145, 250 may use multiple independent Tx chains for communication using multiple carriers, such as when the UE 145, 250 uses intra-band non-contiguous carrier aggregation or inter-band communication for the multiple carriers.

As indicated above, FIG. 8 is provided as an example. Other examples are possible and may differ from what was described in connection with FIG. 8.

A UE 145, 250 may be capable of using multiple carriers for communications. For example, the UE 145, 250 may use contiguous carrier aggregation (e.g., as shown in FIG. 7A), non-contiguous carrier aggregation (e.g., as shown in FIG.

7B), and/or the like. When a UE 145, 250 uses multiple carriers for communications, different carriers may be capable of carrying communications with different levels of quality. For example, the level of quality may be impacted by a resource block allocation assigned to a carrier, a transmit power used on a carrier, and/or the like.

In some aspects, different types of communications may be associated with different Quality of Service (QoS) requirements, such as different requirements for latency, delay, jitter, block error rate (BLER), packet error rate, and/or the like. For example, a voice communication (e.g., a VoLTE call) may have stricter requirements than a data communication. However, the UE 145, 250 may not necessarily transmit high priority communications on a high quality carrier.

Aspects described herein assist the UE 145, 250 with identifying a high quality carrier on which high priority communications are to be transmitted, thereby improving resource allocation, network throughput, and/or improving a user experience. For example, the UE 145, 250 may identify a carrier for transmission of high priority communications based at least in part on resource block allocations for multiple carriers, as described in more detail below. Additionally, or alternatively, when the UE 145, 250 detects that a transmit power is to be reduced, the UE 145, 250 may reduce the transmit power on the high priority carrier (e.g., carrying the high priority communications) less than a transmit power reduction on a low priority carrier (e.g., that does not carry the high priority communications), as described in more detail below.

Figure 9:
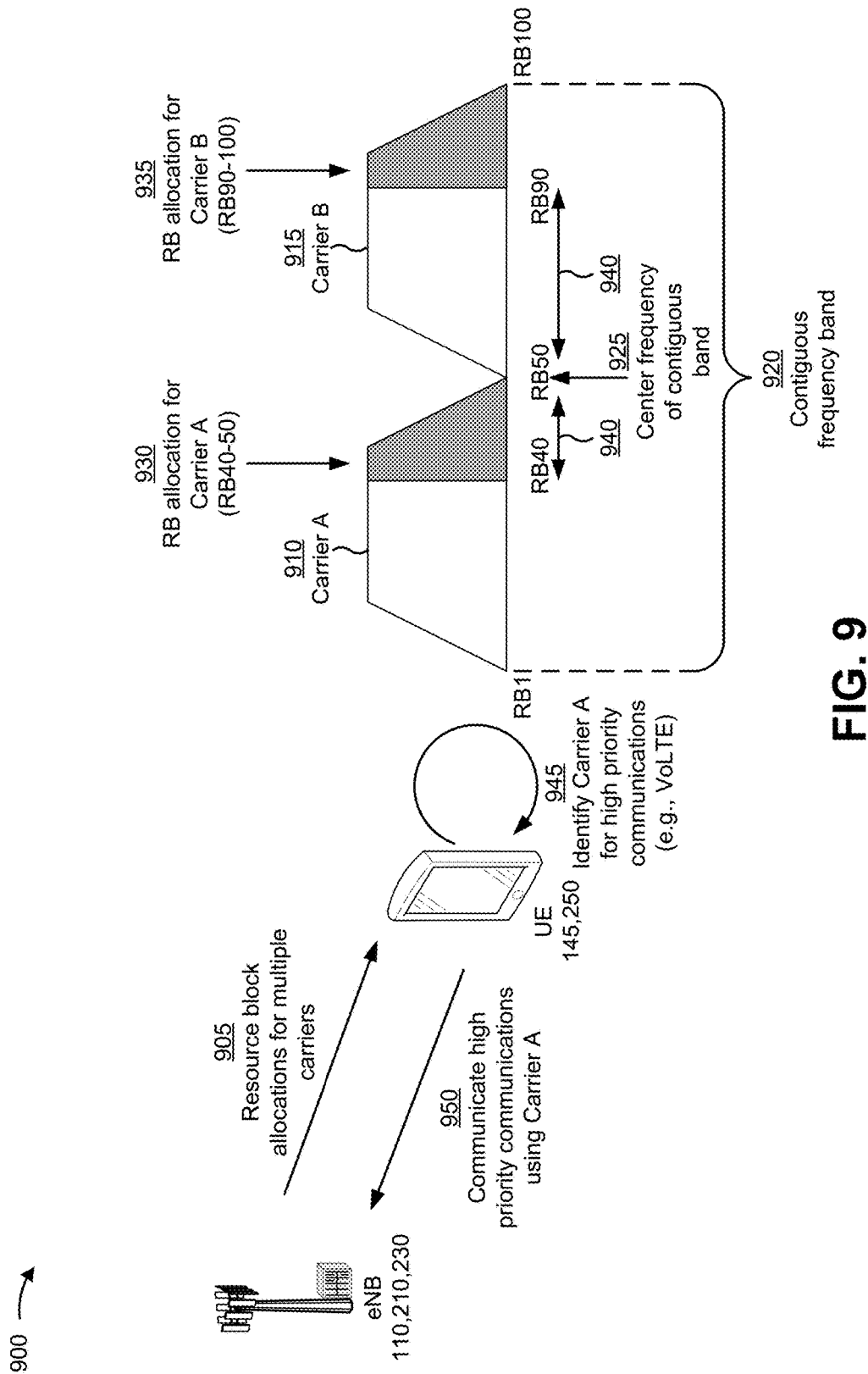
FIGS. 9-11 are diagrams illustrating examples of VoLTE call prioritization for multiple carriers, in accordance with various aspects of the present disclosure.

FIG. 9 is a diagram illustrating an example 900 of VoLTE call prioritization for multiple carriers, in accordance with various aspects of the present disclosure. While some aspects are described herein in connection with prioritizing VoLTE calls, other types of communications may be prioritized, such as Voice over IP (VoIP) calls, video calls, communications associated with a QoS parameter that satisfies a threshold, and/or the like. These other types of communications and VoLTE calls are referred to herein collectively as high priority communications. In some aspects, a high priority communication may be associated with a QoS parameter that satisfies a threshold.

As shown in FIG. 9, a UE 145, 250 may receive, from an eNB 110, 210, 230, multiple resource block allocations corresponding to multiple carriers used by the UE 145, 250. In FIG. 9, the multiple carriers are contiguous carriers, as described above in connection with FIG. 7A. When the UE 145, 250 uses contiguous carriers, the UE 145, 250 may use a single RF communication chain (e.g., a single Tx chain and/or Rx chain) for communications on the contiguous carriers. In this case, a local oscillator of the UE 145, 250 may be tuned to the center frequency of the contiguous frequency band 920 that includes the contiguous carriers (e.g., RB 50 of FIG. 9). In some aspects, RBs located nearer to the tuned frequency of the local oscillator may have higher quality due to, for example, better Tx waveforms, lower roll-off, and/or the like. Thus, as shown by reference number 945, the UE 145, 250 may identify the first carrier 910 (e.g., Carrier A) for high priority communications, such as VoLTE calls.

More specifically, the multiple carriers may include a first carrier 910 (e.g., shown as Carrier A) and a second carrier 915 (e.g., shown as Carrier B) that are adjacent to one another in a contiguous frequency band 920 (e.g., a contiguous carrier aggregation frequency band that includes the multiple carriers). As shown, the contiguous frequency band 920 spans from resource block (RB) 1 to RB 100, with the first carrier 910 spanning from RB 1 to RB 50, and the second carrier 915 spanning from RB 50 to RB 100. Thus, as shown by reference number 925, the center frequency of the contiguous frequency band 920 is located at RB 50.

As shown by reference number 930, the UE 145, 250 may receive a first RB allocation for the first carrier 910, which is shown as an RB allocation from RB 40 to RB 50. Similarly, as shown by reference number 935, the UE 145, 250 may receive a second RB allocation for the second carrier 915, which is shown as an RB allocation from RB 90 to RB 100.

The UE 145, 250 may compare the frequencies corresponding to the resource block allocations for the carriers, and may identify a carrier to be used for communicating high priority communications based at least in part on the comparison. For example, when the carriers are contiguous, the UE 145, 250 may identify the carrier to be used for high priority communications based at least in part on comparing the frequencies of the resource block allocations to the center frequency of the contiguous frequency band 920. In this case, the center frequency may divide the contiguous frequency band in half. Additionally, or alternatively, the UE 145, 250 may compare the frequencies to a middle point and/or a middle region of the contiguous frequency band 920.

As shown by reference number 940, the RB allocation for the first carrier 910 may be closer in frequency to the center frequency, and the RB allocation for the second carrier 915 may be farther in frequency from the center frequency. For example, the RB allocation of RB 40 to RB 50, for the first carrier 910, includes the center frequency of RB 50 (e.g., is positioned zero RBs from the center frequency), and the RB allocation of RB 90 to RB 100, for the second carrier 915, is positioned 40 RBs away from the center frequency. Thus, the RB allocation for the first carrier 910 is closer in frequency to the center frequency of the contiguous frequency band 920.

As shown by reference number 950, the UE 145, 250 may communicate the high priority communications using the first carrier 910 (e.g., Carrier A). In this way, the UE 145, 250 may use a higher quality carrier, identified using resource block allocations for multiple carriers, to transmit high priority communications, thereby assisting with satisfaction of QoS requirements and improving quality of the high priority communications. In this manner, the UE 145, 250 may more efficiently use resource blocks, for example, associated with contiguous carriers and/or reduce or avoid band edge roll-off effects.

As indicated above, FIG. 9 is provided as an example. Other examples are possible and may differ from what was described with respect to FIG. 9.

Figure 10:
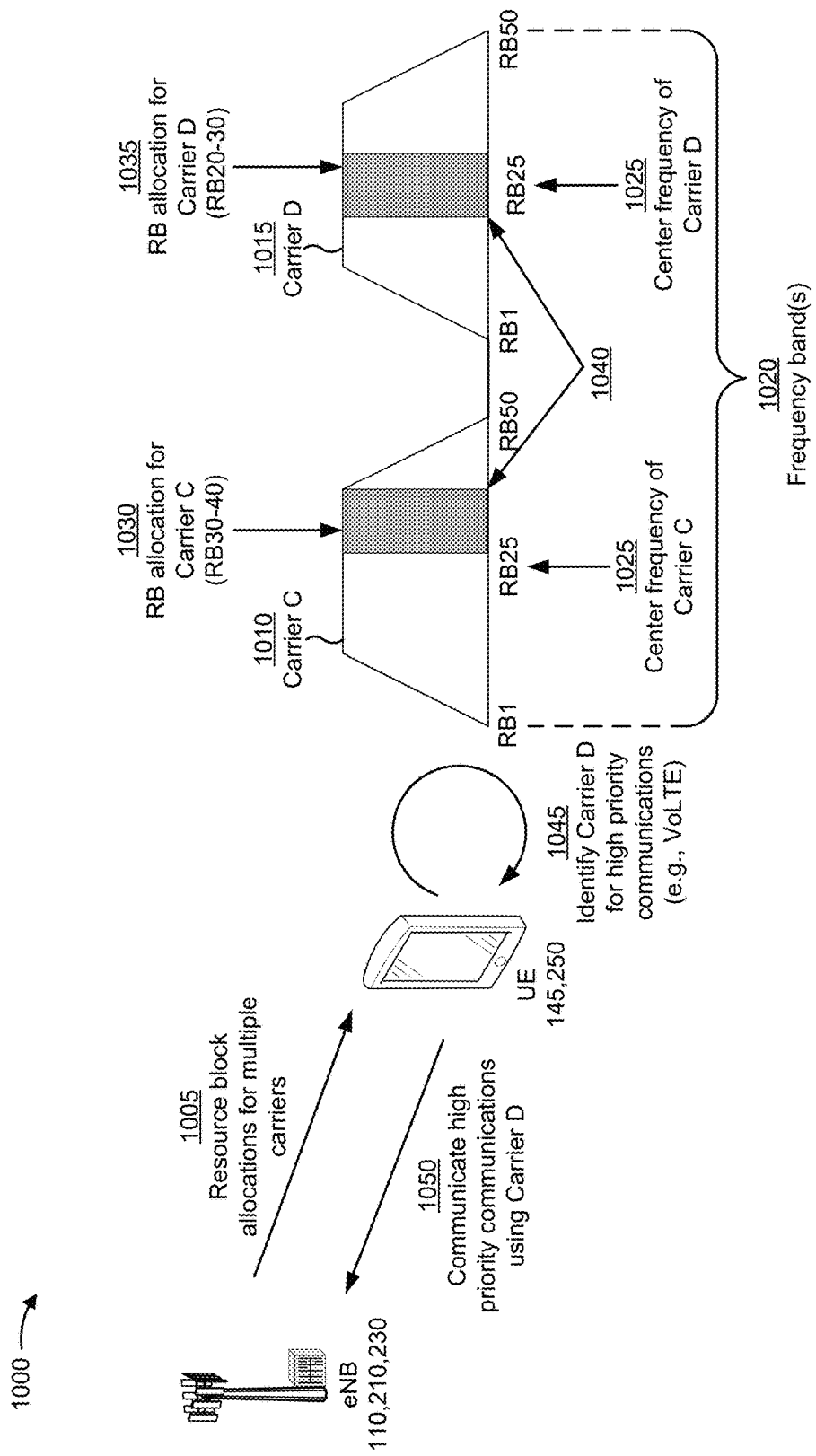

FIG. 10 is a diagram illustrating another example 1000 of VoLTE call prioritization for multiple carriers, in accordance with various aspects of the present disclosure. While some aspects are described herein in connection with prioritizing VoLTE calls, other types of communications may be prioritized, as described above in connection with FIG. 9.

As shown in FIG. 10, a UE 145, 250 may receive, from an eNB 110, 210, 230, multiple resource block allocations corresponding to multiple carriers used by the UE 145, 250. In FIG. 10, the multiple carriers are non-contiguous carriers, as described above in connection with FIG. 7B. In some aspects, different non-contiguous carriers may be associated with the same operator (e.g., intra-operator). In some aspects, different non-contiguous carriers may be associated with different operators (e.g., inter-operator). When the UE 145, 250 uses non-contiguous carriers, the UE 145, 250 may use multiple RF communication chains (e.g., multiple Tx chains and/or Rx chains) for communications on the non-contiguous carriers (e.g., each non-contiguous carrier may use an independent Tx chain). In this case, a first local oscillator of the UE 145, 250 may be tuned to the center frequency of the first carrier 1010 (e.g., RB 25 of the first portion of frequency band(s) 1020), a second local oscillator of the UE 145, 250 may be tuned to the center frequency of the second carrier 1015 (e.g., RB 25 of the second portion of frequency band(s) 1020), and/or the like. In some aspects, RBs located nearer to the tuned frequency of a local oscillator may have higher quality due to, for example, better Tx waveforms, lower roll-off, and/or the like. Thus, as shown by reference number 1045, the UE 145, 250 may identify the second carrier 1015 (e.g., Carrier D) for high priority communications, such as VoLTE calls.

More specifically, the multiple carriers may include a first carrier 1010 (e.g., shown as Carrier C) and a second carrier 1015 (e.g., shown as Carrier D) that are separated by a gap in one or more frequency bands 1020. In some aspects, frequency band(s) 1020 includes a single frequency band (e.g., a single operating frequency), and the carriers are non-contiguous intra-band carriers aggregated in the single frequency band. In some aspects, frequency band(s) 1020 includes multiple frequency bands (e.g., multiple operating frequencies), and the carriers are non-contiguous inter-band carriers included in multiple frequency bands. As shown, the first carrier 1010 includes RB 1 to RB 50 along a first portion of frequency band(s) 1020, and the second carrier 1015 includes RB 1 to RB 50 along a second portion of frequency band(s) 1020. Thus, as shown by reference number 1025, the center frequency of the first carrier 1010 is located at, near, coincides with, or is associated with RB 25 in the first portion, and the center frequency of the second carrier 1015 is located at, near, coincides with, or is associated with RB 25 in the second portion.

As shown by reference number 1030, the UE 145, 250 may receive a first RB allocation for the first carrier 1010, which is shown as an RB allocation from RB 30 to RB 40 within the first portion of the frequency band(s) 1020. Similarly, as shown by reference number 1035, the UE 145, 250 may receive a second RB allocation for the second carrier 1015, which is shown as an RB allocation from RB 20 to RB 30 within the second portion of the frequency band(s) 1020.

The UE 145, 250 may compare the frequencies corresponding to the resource block allocations for the carriers, and may identify a carrier to be used for communicating high priority communications based at least in part on the comparison. For example, when the carriers are non-contiguous, the UE 145, 250 may identify the carrier to be used for high priority communications based at least in part on comparing the frequencies of the resource block allocations to the center frequencies of the carriers that correspond to the resource block allocations. In this case, a center frequency may divide a frequency band, used for a carrier, in half. Additionally, or alternatively, the UE 145, 250 may compare the frequencies to corresponding middle points and/or middle regions of the corresponding carriers.

As shown by reference number 1040, the RB allocation for the first carrier 1010 may be farther in frequency from the center frequency of the first carrier 1010, and the RB allocation for the second carrier 1015 may be closer in frequency to the center frequency of the second carrier 1015. For example, the RB allocation of RB 30 to RB 40, for the first carrier 1010, is positioned 5 RBs from the first carrier's center frequency of RB 25, and the RB allocation of RB 20 to RB 30, for the second carrier 1015, includes the second carrier's center frequency of RB 25 (e.g., is positioned zero RBs from the center frequency). Thus, the RB allocation for the second carrier 1015 is closer in frequency to the center frequency of the second carrier 1015, as compared to the distance from the RB allocation of the first carrier 1010 to the center frequency of the first carrier 1010.

As shown by reference number 1050, the UE 145, 250 may communicate the high priority communications using the second carrier 1015 (e.g., Carrier D). In this way, the UE 145, 250 may use a higher quality carrier, identified using resource block allocations for multiple carriers, to transmit high priority communications, thereby assisting with satisfaction of QoS requirements and improving quality of the high priority communications.

As indicated above, FIG. 10 is provided as an example. Other examples are possible and may differ from what was described with respect to FIG. 10.

Figure 11:
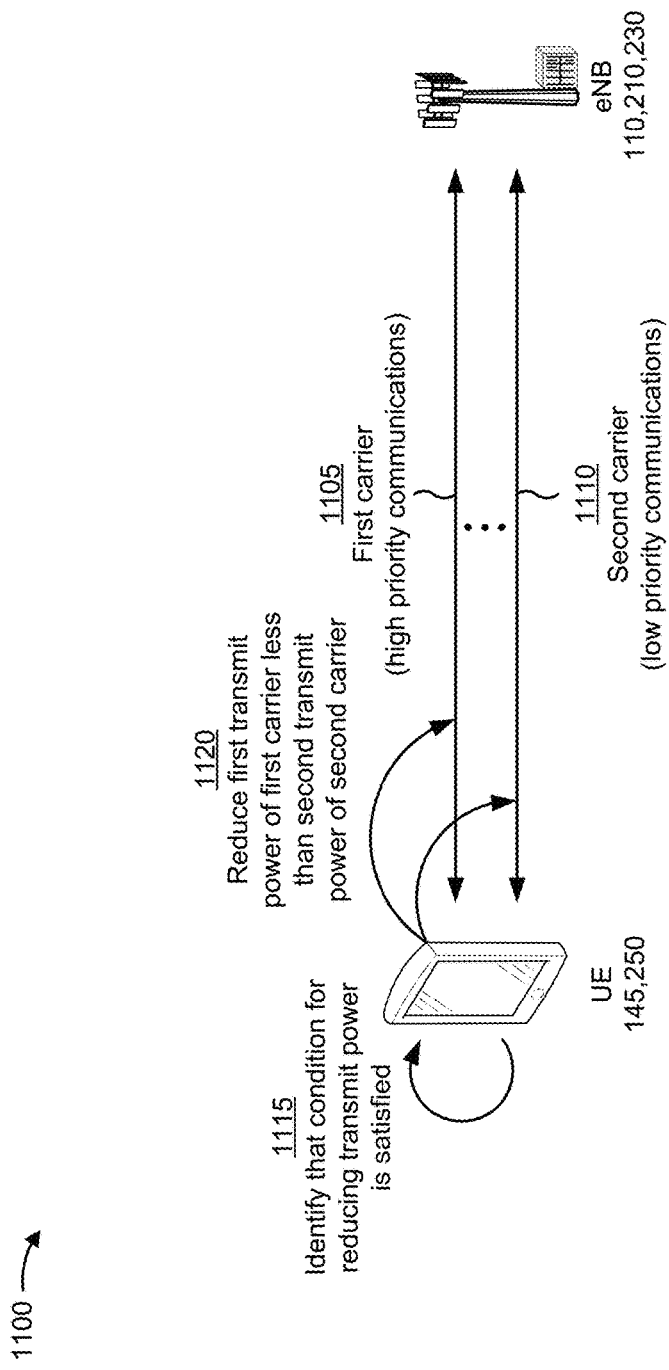

FIG. 11 is a diagram illustrating another example 1100 of VoLTE call prioritization for multiple carriers, in accordance with various aspects of the present disclosure. While some aspects are described herein in connection with prioritizing VoLTE calls, other types of communications may be prioritized, as described above in connection with FIG. 9.

As shown in FIG. 11, a UE 145, 250 may use multiple carriers to communicate with an eNB 110, 210, 230. For example, the UE 145, 250 may use a first carrier 1105 for high priority communications with the eNB 110, 210, 230, and may use a second carrier 1110 for low priority communications with the eNB 110, 210, 230. In some aspects, the high priority communications may include a VoLTE call, and the low priority communications may include communications other than a VoLTE call (e.g., best effort traffic and/or the like). Additionally, or alternatively, the high priority communications may be associated with one or more QoS parameters that satisfy one or more thresholds, and the low priority communications may be associated with one or more QoS parameters that do not satisfy the one or more thresholds. The multiple carriers may be aggregated as described elsewhere herein in connection with FIGS. 7A and 7B (e.g., may be contiguous intra-band carriers aggregated in a frequency band, may be non-contiguous intra-band carriers aggregated in a frequency band, may be non-contiguous inter-band carriers aggregated across multiple frequency bands, and/or the like).

As shown by reference number 1115, the UE 145, 250 may identify that a condition for reducing transmit power is satisfied. For example, the UE 145, 250 may identify a thermal-based reduction to reduce the heat generated by the UE 145, 250 when the UE is operating at high power. Additionally, or alternatively, the UE 145, 250 may identify a specific absorption rate (SAR)-based reduction to ensure compliance with radiation limits. Additionally, or alternatively, the UE 145, 250 may identify a maximum transmit power reduction (e.g., a maximum power reduction (MPR), an additional MPR (A-MPR), and/or the like) to ensure compliance with 3GPP specifications regarding transmit power for different combinations of modulation scheme, RB allocation, frequency band, and/or the like.

As shown by reference number 1120, based at least in part on identifying the condition, the UE 145, 250 may reduce a first transmit power, corresponding to the first carrier 1105, less than a reduction in a second transmit power corresponding to the second carrier 1110. For example, if the UE 145, 250 is currently transmitting with 20 dBm of combined transmit power (e.g., 17 dBm on the first carrier 1105 and 17 dBm on the second carrier 1110), and is to apply a power reduction of 3 dBm, then the UE 145, 250 may reduce the first transmit power of the first carrier 1105 to approximately 15.5 dBm, and may reduce the second transmit power of the second carrier 1110 to approximately 13 dBm. In this way, the UE 145, 250 may prioritize high priority communications while satisfying transmit power requirements.

In some aspects, a high priority communication may be associated with a QoS requirement (e.g., where a QoS parameter satisfies a threshold). In this case, the UE 145, 250 may determine the first transmit power based at least in part on the QoS requirement. For example, the UE 145, 250 may reduce the first transmit power to a level that continues to satisfy the QoS requirement. In this case, the UE 145, 250 may reduce the second transmit power by an amount that, when combined with the first transmit power, satisfies the maximum combined transmit power for the UE 145, 250. In this way, the UE 145, 250 may satisfy both QoS requirements and transmit power requirements.

As indicated above, FIG. 11 is provided as an example. Other examples are possible and may differ from what was described with respect to FIG. 11.

Figure 12:
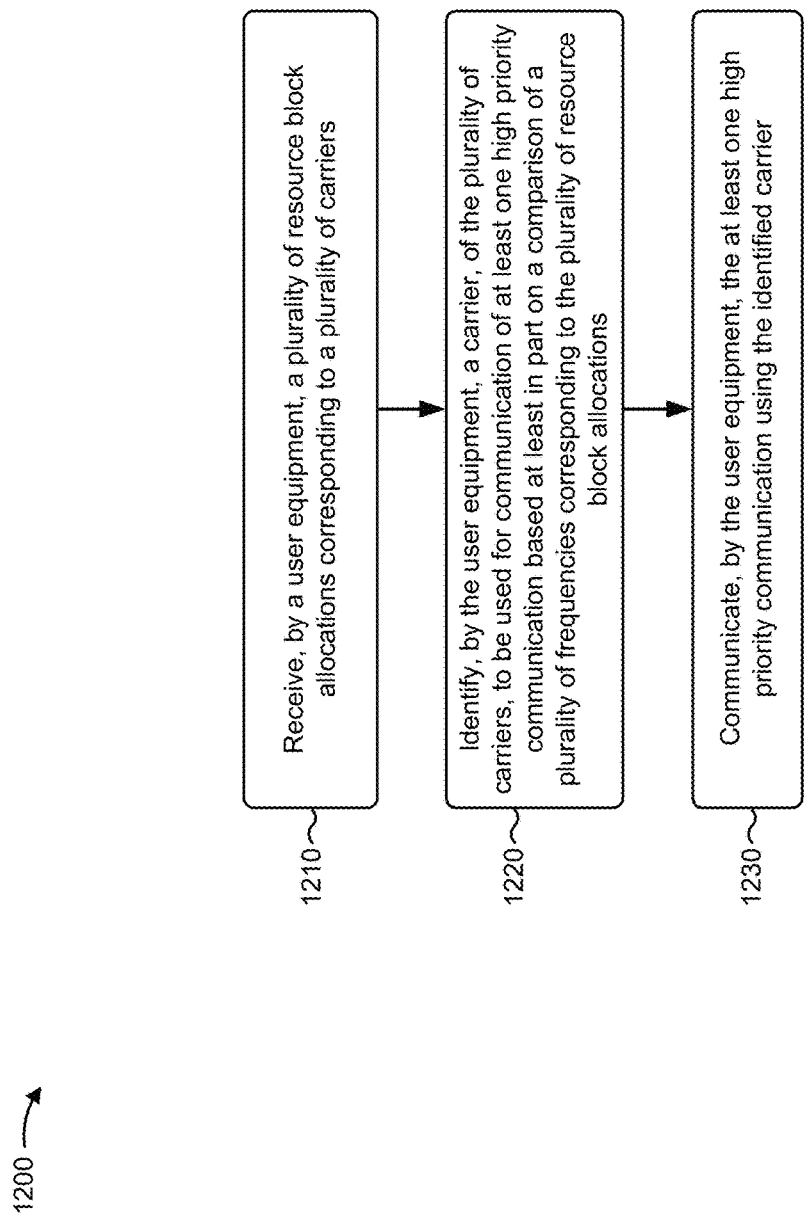
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., UE 145, 250) prioritizes high priority communications when using multiple carriers.

As shown in FIG. 12, in some aspects, process 1200 may include receiving, by a wireless communication device, a plurality of resource block allocations corresponding to a plurality of carriers (block 1210). For example, the wireless communication device (e.g., UE 145, 250) may receive a plurality of resource block allocations corresponding to a plurality of carriers, as described above in connection with FIGS. 9 and 10.

As further shown in FIG. 12, in some aspects, process 1200 may include identifying, by the wireless communication device, a carrier, of the plurality of carriers, to be used for communication of at least one high priority communication based at least in part on a comparison of a plurality of frequencies corresponding to the plurality of resource block allocations (block 1220). For example, the wireless communication device (e.g., UE 145, 250) may identify a carrier, of the plurality of carriers, to be used for communication of at least one high priority communication based at least in part on a comparison of a plurality of frequencies corresponding to the plurality of resource block allocations, as described above in connection with FIGS. 9 and 10.

As further shown in FIG. 12, in some aspects, process 1200 may include communicating, by the wireless communication device, the at least one high priority communication using the identified carrier (block 1230). For example, the wireless communication device (e.g., UE 145, 250) may communicate the at least one high priority communication using the identified carrier, as described above in connection with FIGS. 9 and 10.

In some aspects, the plurality of carriers are component carriers used in carrier aggregation. In some aspects, the plurality of carriers correspond to a plurality of network operators, and the wireless communication device is at least one of a dual subscriber identity module (SIM) dual active (DSDA) wireless communication device or a dual radio wireless communication device.

In some aspects, the carrier is identified based at least in part on a comparison of one or more frequencies, associated with a resource block allocation corresponding to the carrier, and at least one of a center frequency, middle point, or middle region of a contiguous carrier aggregation frequency band that includes the plurality of carriers. In some aspects, the wireless communication device employs a single radio frequency (RF) communication chain for communications using the plurality of carriers.

In some aspects, the carrier is identified based at least in part on a comparison of one or more frequencies, associated with a resource block allocation corresponding to the carrier, and at least one of a center frequency, middle point, or middle region associated with the carrier. In some aspects, the wireless communication device employs multiple radio frequency (RF) communication chains for communications using the plurality of carriers. In some aspects, the plurality of carriers are non-contiguous intra-band carriers aggregated in a frequency band. In some aspects, the plurality of carriers are non-contiguous inter-band carriers included in multiple frequency bands.

In some aspects, the at least one high priority communication is associated with a Voice over Long Term Evolution (VoLTE) call. In some aspects, the at least one high priority communication is associated with a quality of service parameter that satisfies a threshold. In some aspects, the wireless communication device identifies that a condition for reducing transmit power is satisfied, and reduces a first transmit power, corresponding to the identified carrier of the plurality of carriers, less than a reduction in a second transmit power, corresponding to a second carrier of the plurality of carriers, based at least in part on a determination that the identified carrier is used for communicating the at least one high priority communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
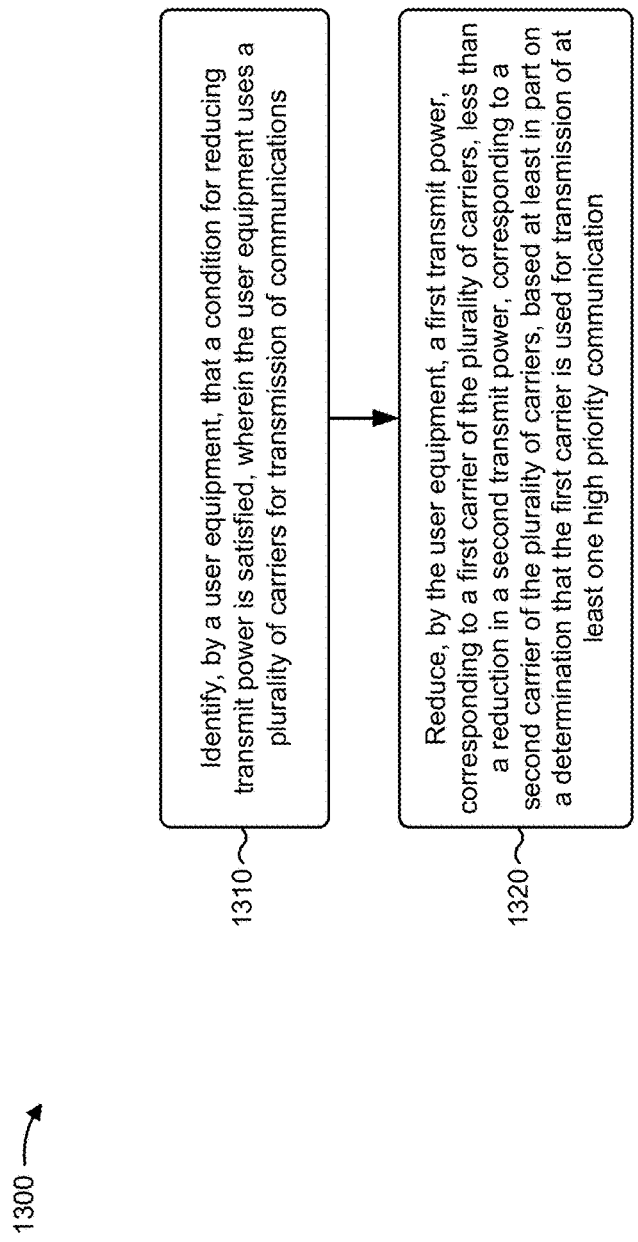
FIG. 13 is a diagram illustrating another example process performed, for example, by a wireless communication device, in accordance with various aspects of the present disclosure.

FIG. 13 is a diagram illustrating an example process 1300 performed, for example, by a wireless communication device, in accordance with various aspects of the present disclosure. Example process 1300 is an example where a wireless communication device (e.g., UE 145, 250) prioritizes high priority communications when using multiple carriers.

As shown in FIG. 13, in some aspects, process 1300 may include identifying, by a wireless communication device, that a condition for reducing transmit power is satisfied, wherein the wireless communication device uses a plurality of carriers for transmission of communications (block 1310). For example, the wireless communication device (e.g., UE 145, 250) may identify that a condition for reducing transmit power is satisfied, as described above in connection with FIG. 11.

As further shown in FIG. 13, in some aspects, process 1300 may include reducing, by the wireless communication device, a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication (block 1320). For example, the wireless communication device (e.g., UE 145, 250) may reduce a first transmit power, corresponding to the first carrier, less than a reduction in a second transmit power, corresponding to the second carrier, based at least in part on a determination that the first carrier is used for transmission of at least one high priority communication, as described above in connection with FIG. 11.

In some aspects, the plurality of carriers are component carriers used in carrier aggregation. In some aspects, the plurality of carriers correspond to a plurality of network operators, and the wireless communication device is a dual subscriber identity module (SIM) dual active (DSDA) wireless communication device or a dual radio wireless communication device. In some aspects, the at least one high priority communication is associated with a Voice over Long Term Evolution (VoLTE) call. In some aspects, the condition for reducing transmit power includes at least one of: a thermal-based reduction, a specific absorption rate (SAR)-based reduction, a maximum transmit power reduction, or some combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method of wireless communication, comprising:
   receiving, by a user equipment, a plurality of resource block allocations corresponding to a plurality of carriers;
   identifying, by the user equipment, a carrier, of the plurality of carriers, to be used for communication of at least one high priority communication based at least in part on a comparison of a plurality of frequencies corresponding to the plurality of resource block allocations;
   communicating, by the user equipment, the at least one high priority communication using the identified carrier;
   identifying, by the user equipment, that a condition for reducing transmit power is satisfied,
      the condition being satisfied based on at least one of a specific absorption rate (SAR)-based reduction to comply with a radiation limit or a thermal-based reduction to reduce heat; and
   reducing, by the user equipment, a first transmit power, corresponding to the identified carrier of the plurality of carriers, less than a reduction in a second transmit power, corresponding to a second carrier of the plurality of carriers, based at least in part on a determination that the identified carrier is used for communicating the at least one high priority communication.

2. The method of claim 1, wherein the plurality of carriers are component carriers used in carrier aggregation.

3. The method of claim 1,
   wherein the plurality of carriers correspond to a plurality of network operators; and
   wherein the user equipment is at least one of a dual subscriber identity module (SIM) dual active (DSDA) user equipment or a dual radio user equipment.

4. The method of claim 1, wherein the carrier is identified based at least in part on a comparison of one or more frequencies, associated with a resource block allocation corresponding to the carrier, and at least one of a center frequency, middle point, or middle region of a contiguous carrier aggregation frequency band that includes the plurality of carriers.

5. The method of claim 4, further comprising employing a single radio frequency (RF) communication chain for communications using the plurality of carriers.

6. The method of claim 1, wherein the carrier is identified based at least in part on a comparison of one or more frequencies, associated with a resource block allocation corresponding to the carrier, and at least one of a center frequency, middle point, or middle region associated with the carrier.

7. The method of claim 6, further comprising employing multiple radio frequency (RF) communication chains for communications using the plurality of carriers.

8. The method of claim 6, wherein the plurality of carriers are non-contiguous intra-band carriers aggregated in a frequency band.

9. The method of claim 6, wherein the plurality of carriers are non-contiguous inter-band carriers included in multiple frequency bands.

10. The method of claim 1, wherein the at least one high priority communication is associated with a Voice over Long Term Evolution (VoLTE) call.

11. The method of claim 1, wherein the at least one high priority communication is associated with a quality of service parameter that satisfies a threshold.

12. A method of wireless communication, comprising:
identifying, by a user equipment, that a condition for reducing transmit power is satisfied,
wherein the user equipment uses a plurality of carriers for transmission of communications, and
wherein the condition is satisfied based on at least one of a specific absorption rate (SAR)-based reduction to comply with a radiation limit or a thermal-based reduction to reduce heat; and
reducing, by the user equipment, a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication.

13. The method of claim 12, wherein the plurality of carriers are component carriers used in carrier aggregation.

14. The method of claim 12,
wherein the plurality of carriers correspond to a plurality of network operators; and
wherein the user equipment is a dual subscriber identity module (SIM) dual active (DSDA) user equipment or a dual radio user equipment.

15. The method of claim 12, wherein the at least one high priority communication is associated with a Voice over Long Term Evolution (VoLTE) call.

16. The method of claim 12, wherein the condition for reducing transmit power includes at least one of:
the thermal-based reduction,
the SAR-based reduction,
a maximum transmit power reduction, or
some combination thereof.

17. A user equipment, comprising:
a memory; and
one or more processors operatively coupled to the memory, the one or more processors configured to:
receive a plurality of resource block allocations corresponding to a plurality of carriers;
identify a carrier, of the plurality of carriers, to be used for communication of at least one high priority communication based at least in part on a comparison of a plurality of frequencies corresponding to the plurality of resource block allocations;
communicate the at least one high priority communication using the identified carrier;
identify that a condition for reducing transmit power is satisfied,
the condition being satisfied based on at least one of a specific absorption rate (SAR)-based reduction to comply with a radiation limit or a thermal-based reduction to reduce heat; and
reduce a first transmit power, corresponding to the identified carrier of the plurality of carriers, less than a reduction in a second transmit power, corresponding to a second carrier of the plurality of carriers, based at least in part on a determination that the identified carrier is used for communicating the at least one high priority communication.

18. The user equipment of claim 17, wherein the plurality of carriers are component carriers used in carrier aggregation.

19. The user equipment of claim 17,
wherein the plurality of carriers correspond to a plurality of network operators; and
wherein the user equipment is at least one of a dual subscriber identity module (SIM) dual active (DSDA) wireless communication device or a dual radio wireless communication device.

20. The user equipment of claim 17, wherein the carrier is identified based at least in part on a comparison of one or more frequencies, associated with a resource block allocation corresponding to the carrier, and at least one of a center frequency, middle point, or middle region of a contiguous carrier aggregation frequency band that includes the plurality of carriers.

21. The user equipment of claim 20, wherein the one or more processors are further configured to employ a single radio frequency (RF) communication chain for communications using the plurality of carriers.

22. The user equipment of claim 17, wherein the carrier is identified based at least in part on a comparison of one or more frequencies, associated with a resource block allocation corresponding to the carrier, and at least one of a center frequency, middle point, or middle region associated with the carrier.

23. The user equipment of claim 22, wherein the one or more processors are further configured to employ multiple radio frequency (RF) communication chains for communications using the plurality of carriers.

24. The user equipment of claim 22, wherein the plurality of carriers are at least one of:
non-contiguous intra-band carriers aggregated in a frequency band, or
non-contiguous inter-band carriers included in multiple frequency bands.

25. The user equipment of claim 17, wherein the at least one high priority communication is associated with at least one of:
a Voice over Long Term Evolution (VoLTE) call,
a quality of service parameter that satisfies a threshold, or
some combination thereof.

26. A user equipment, comprising:
a memory; and
one or more processors operatively coupled to the memory, the one or more processors configured to:
identify that a condition for reducing transmit power is satisfied,
wherein the user equipment uses a plurality of carriers for transmission of communications, and
wherein the condition is satisfied based on one of a specific absorption rate (SAR)-based reduction to comply with a radiation limit or a thermal-based reduction to reduce heat; and
reduce a first transmit power, corresponding to a first carrier of the plurality of carriers, less than a reduction in a second transmit power, corresponding to a second carrier of the plurality of carriers, based at least in part on a determination that the first carrier is used for transmission of at least one high priority communication.

27. The user equipment of claim 26, wherein the plurality of carriers are at least one of:
   contiguous intra-band carriers aggregated in a single frequency band,
   non-contiguous intra-band carriers aggregated in a single frequency band, or
   non-contiguous inter-band carriers included in multiple frequency bands.

28. The user equipment of claim 26, wherein the condition for reducing transmit power includes at least one of:
   the thermal-based reduction,
   the SAR-based reduction,
   a maximum transmit power reduction, or
   some combination thereof.

29. The user equipment of claim 26, wherein the at least one high priority communication is associated with a Voice over Long Term Evolution (VoLTE) call.

30. The user equipment of claim 26, wherein the first transmit power is reduced further based at least in part on a QoS requirement.

* * * * *